Figure 1A:
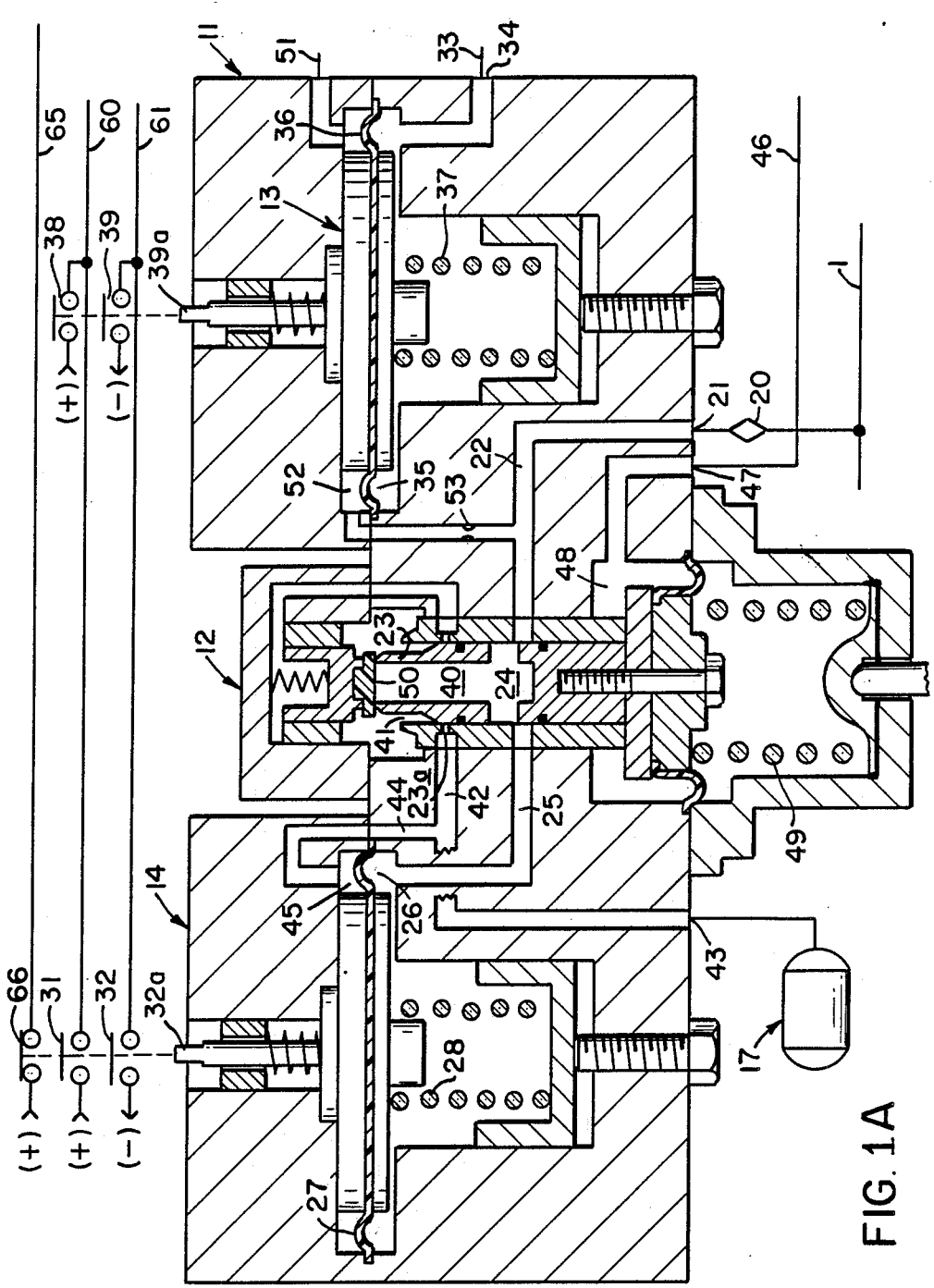

United States Patent [19]

Ingalls

[11] Patent Number: 4,971,398

[45] Date of Patent: Nov. 20, 1990

[54] SUPPRESSION CONTROL OF CAB SIGNAL AUTOMATED BRAKE APPLICATION

[75] Inventor: Robert S. Ingalls, Adams Center, N.Y.

[73] Assignee: General Signal Corporation, Stamford, Conn.

[21] Appl. No.: 402,046

[22] Filed: Sep. 5, 1989

[51] Int. Cl.⁵ .............................................. B60T 7/12
[52] U.S. Cl. ........................................ 303/18; 303/55
[58] Field of Search ................ 303/3, 15, 16, 18, 19, 303/20, 33, 35, 55

[56] References Cited

U.S. PATENT DOCUMENTS 3,076,681  2/1963  Erson et al. .......................... 303/18
4,013,322  3/1977  Worbois ................................. 303/18

Primary Examiner—Duane A. Reger
Attorney, Agent, or Firm—Robert R. Hubbard; Harold S. Wynn

[57] ABSTRACT

A suppression control device comprises a relay valve together with respective temporary and permanent diaphragm operated circuit breakers for governing suppression of a cab signal penalty brake application that can be used with either of two principal types of locomotive braking systems as well as being adapted to automatically adjust to changes in brake pipe pressure settings of 90 psi and 110 psi.

20 Claims, 2 Drawing Sheets

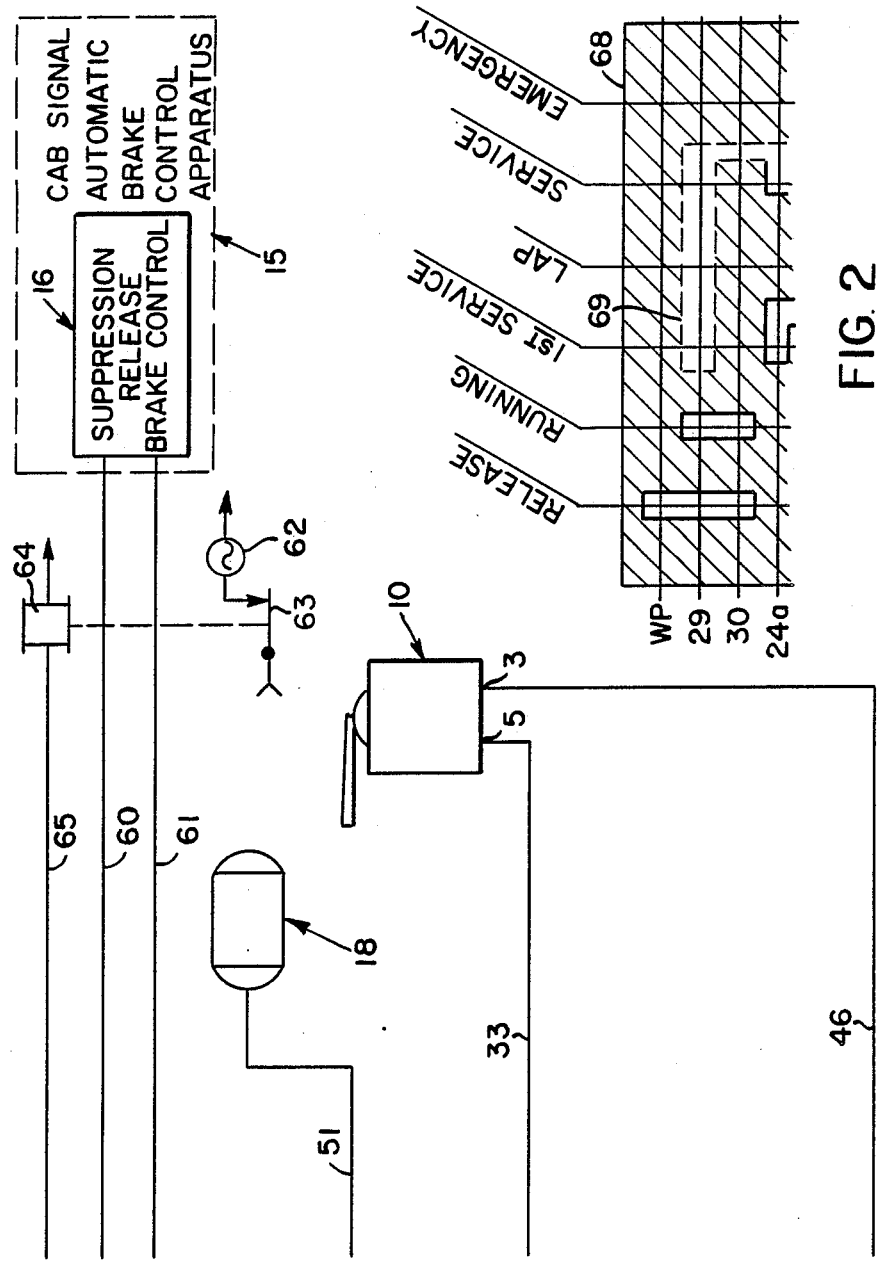

SUPPRESSION CONTROL OF CAB SIGNAL AUTOMATED BRAKE APPLICATION

BACKGROUND OF THE INVENTION

This invention relates to suppression control of cab signal penalty brake application, and it more particularly pertains to a low cost system of suppression control for switching locomotives and the like handling short trains.

Basic locomotive brake control systems having suppression of cab signal automatic brake applications, known as the "No. 24-RL" and "No. 26-C" systems, are designed for main line locomotive operations and are complicated and expensive. These braking systems are adapted for use with complex suppression control for automatic cab signal braking control for locomotives used on long trains while such switching locomotives that have limited use in cab signal control territory have not been required to have cab signal control equipment.

In view of the possibility of accidents involving switching locomotives that do not have cab signal control, it has been required that more locomotives using No. 26-C and No. 24-RL brake control systems, for example, without cab signal automatic brake control, be modified to add the automatic brake control system and associated suppression control valve apparatus. This suppression control as disclosed for use in the above systems and in the Erson et al U.S. Pat. No. 3,076,681 and in the Worbois et al U.S. Pat. No. 4,013,322, is too complicated and expensive for its proposed limited use on switch locomotives that generally operate on trains of 40 or less railway cars.

An object of the present invention is to provide a fluid brake control system for switching locomotives having suppression control of cab signal penalty brake applications that substantially obviates one or more of the limitations and disadvantages of the described prior art systems.

Another object of the present invention is to reduce manufacturing and maintenance costs of suppression controlling automatic cab signal brake apparatus for switching locomotives.

Other objects, purposes and characteristic features of the present invention will be in part obvious from the accompanying drawings and in part pointed out as the description of the invention progresses.

SUMMARY OF INVENTION

This invention provides for the modification of a locomotive brake control system of the No. 26-C or No. 24-RL type, that adds a simplified suppression valve device having only a reference control valve piloted by an output port of the No. 26-C or No. 24-RL system together with a pair of diaphragm operated circuit breakers, one of the circuit breakers being for controlling temporary suppression of a cab signal penalty brake application, and the other of the circuit breakers being used for controlling permanent suppression of a cab signal penalty brake application. Contacts of the circuit breakers jointly render suppression of brake control by cab signal automatic brake apparatus effective contacts of the temporary suppression circuit breaker being used when brake pipe reduction is in progress and less than 17 psi. and contacts of the permanent suppression circuit breaker being used when brake pipe pressure is reduced at least 17 psi.

For a better understanding of the present invention, together with other and further objects thereof reference is had to the following description taken in connection with the accompanying drawings, while its scope will be pointed out in the appending claims.

DRAWINGS

FIGS. 1A and 1B, when placed end-to-end, illustrate schematically and partly in elevational cross section, a system of suppression control of cab signal penalty brake applications according to a preferred embodiment of the present invention applications; and, FIG. 2 is an operational diagram in part of a No. 24-RL brake control lever illustrating by dashed lines how pressure at port 29 of that valve can be modified for use to govern suppression according to the present invention.

With reference to FIGS. 1A and 1B, locomotive brake control apparatus is illustrated comprising a brake pipe 1, a manual brake control valve 10 having an output port 3 for control of a suppression control device 11, and another port 5 connected to the usual equalizing reservoir (not shown). The suppression control on device 11 comprises a reference control valve 12 piloted by fluid pressure at port 3 of a manual level 10 (see FIG. 2) and a pair of similar diaphragm circuit breakers 13 and 14 for temporary and permanent suppression control respectively of cab signal controlled automatic brake control apparatus 15, having a suppression release brake control device 16 controlled by the temporary and permanent circuit breakers 13 and 14 respectively. A reference volume 17 and a timing volume 18 are connected to the suppression brake control device 11. The reference volume 17 can be a 220 cu. in volume reservoir and the timing volume can be 310 cu. in. reservoir.

NORMAL CONDITIONS

With brake control valve 10 in a release or running position, there is output at port 3 of the manual control valve 10 that is delivered over passage 46 to port 47 and chamber 48 of reference control valve 12 for causing reference valve 12 to move down to charge the volume 17 to brake pipe 1 pressure. Contacts of both the temporary circuit breaker 13 and the permanent circuit breaker 14 are open to de-energize the suppression control device 16. The brake pipe 1 is connected through a filter 20, a port 21, and through a passage 22, to a spool valve 23 of reference control valve 12, and the brake pipe pressure is applied through passage 24 of the spool valve 23 and passage 25 to a chamber 26 beneath diaphragm 27 of the diaphragm circuit breaker 14. Brake pipe pressure beneath the diaphragm 27, together with force of a permanent suppression spring 28 normally maintains contacts 31 and 32 open in a control circuit for suppression control device 16 the contacts 31 and 32 being operate by a longitudinal push rod 32a. Volume 18 is always connected to brake pipe 1 through a choke 53.

Also in the release position, equalization reservoir air pressure is applied by the manual control lever 10 to port 5 and through passage 33 to port 34 of circuit breaker 11 and a chamber 35 beneath diaphragm 36 of the diaphragm circuit breaker 13 to apply pressure beneath the diaphragm 36, together with the force of a temporary suppression spring 37 to maintain the circuit breaker 13 contacts 38 and 39 normally open by operation of push rod 39a.

The reference reservoir 17 is normally charged to brake pipe 1 pressure through peripheral holes 23a in the spool valve 23 of the reference control valve 12 via a central passage 40 and passage 41 between the inner and outer seats of the spool valve 23, passageway 42 and port 43 to the reference reservoir 17. Pressure from the reference reservoir is also applied through passageway 44 to a chamber 45 above the diaphragm 27 in the circuit breaker 14. The pressures on the opposite sides of the diaphragm 27 are substantially the same during normal conditions with the brakes released, and the diaphragm 27 is maintained in its upward position to open the contacts 31 and 32 by the force of permanent suppression spring 28.

SUPPRESSION

An operator of a locomotive initiates penalty suppression by moving his control lever in his 26-C braking system valve 10, for example, or makes a corresponding movement in a 24 type braking system to initiate a service brake application. This vents port 3 of manual control valve 10 and passage 46, permitting spring 49 to raise reference control valve 50 to close; the connection in spool 23 to of reference volume 17 from the brake pipe 1.

The temporary suppression circuit breaker 13 now compares the pressure in timing volume 18, applied over passage 51 to chamber 52 with equalizing reservoir pressure applied from port 5 of brake control valve 10 over passage 33 to chamber 35 below diaphragm 36. When there is a difference in the pressures on the opposite sides of diaphragm 36 of 2 to 3 psi, with the lower pressure being in the chamber 35 below diaphragm 36, the temporary circuit breaker 13 is actuated downwardly to close contacts 38 and 39 and actuate the device 16 to temporarily suppress a penalty brake application. This suppression is just temporary unless brake pipe pressure is further reduced by a deeper service application a 17 psi reduction is reached because the timing volume 18 has its pressure constantly reduced by its connection to the brake pipe 1 through a timing choke 53.

The permanent suppression circuit breaker 14 compares the pressure of reference reservoir 17 in chamber 45 above diaphragm 27 with brake pipe 1 pressure and is adjusted by the force of spring 28 to permanently close circuit breaker contacts 31 and 32 in a circuit for energization of suppression release brake control device 16 only after there has been a 17 psi reduction in the brake pipe 1 pressure.

Upon movement of the locomotive control valve 10 to release position after a brake application, pressure is restored at port 3, or a port 29 (not shown) of a 24-RL brake control system after slight modification to be connected to exhaust through a passage 69 (see FIG. 2), and release condition will be restored in reservoirs 17 and 18 to the conditions described under the side heading of NORMAL CONDITIONS.

With reference to FIG. 2, a portion of a chart is shown indicating the venting of passage 69 upon rotation of a manual brake control lever according to a 24-RL brake control system. The present system can be controlled for use with a 24-RL system if the control valve is modified to provide output on port 29 (not shown) to make it comparable to port 3 of the 26-C system. This requires the 24-RL rotary valve seal to be modified slightly to vent pressure at port 29 during 1st Service, Lap, and Service positions as indicated by dashed lines for passageway 69 by venting air during these intervals. Normal release pressure at this port should be approximately 140 psi.

Suppression of a cab signal penalty brake is obtained upon closure of double break circuit breaker contacts 38 & 39 of temporary suppression contacts or of double break circuit breaker contacts 31 & 32 of permanent suppression contacts by energization of suppression control 16 over wires 60 and 61.

A permanent suppression indicator 62 is governed by a contact 63 of a permanent suppression relay 64, which in turn is controlled over wire 65 by a contact 66 on permanent suppression circuit breaker 14.

It is to be understood that the reference and timing reservoirs are of a size to permit switching of an associated locomotive between the standard brake pipe pressure settings of 90 psi. and 110 psi. without modification, and that the same suppression control system can be used in either 26-C or 24-RL braking systems with only minor modification of one of these systems.

Having thus described a system of suppression of cab signal penalty brake application for switching locomotives having an improved suppression of automatic brake control device as a preferred embodiment of the present invention, it is to be understood that various modification and alterations may be made in the specific embodiment shown without departing from the spirit or scope of the present invention.

I claim:

1. A brake control system for a locomotive having a brake pipe, a manual brake control valve having an equalizing reservoir port and a suppression control port, cab signal penalty brake control apparatus and an improved suppression penalty brake control device comprising:
    (a) a reference control valve piloted by output of the suppression control port of the manual brake control valve for selectively charging a reference volume,
    (b) a pair of similar diaphragm operated circuit breakers having push rods operating electrical contacts respectively for governing the cab signal brake control apparatus,
        (1) the diaphragm of a first of the diaphragm circuit breakers for temporary suppression being operable in accordance with differences in pressure between pressure in a timing volume connected to the brake pipe through a choke and a chamber having pressure governed by output of the equalizing reservoir port of the manual brake control valve,
        (2) the diaphragm of a second of the diaphragm circuit breakers for permanent suppression being operable in accordance with differences in pressure between brake pipe pressure and pressure of the reference volume as governed by the reference control valve, and
    (c) circuit means including the contacts of the diaphragm circuit breakers for selectively rendering suppression of penalty brake control by the cab signal brake control apparatus effective.

2. A brake control system for a locomotive according to claim 1, wherein the first of the diaphragm circuit breakers for temporary suppression of a penalty brake application closes its contacts in accordance with a difference in fluid pressure across its diaphragm within a range of approximately 1½ psi to 2 psi.

3. A brake control system for a locomotive according to claim 2, wherein the second of the diaphragm circuit breakers for permanent suppression of a penalty brake application closes its contacts in accordance with a difference in fluid pressure across its diaphragm within a range of approximately 16 psi to 18 psi.

4. A brake control system for a locomotive according to claim 1, wherein the reference pressure includes pressure in an external reference volume normally charged by output of the reference control valve when the reference control valve senses pilot pressure from the suppression control port of the manual brake control valve.

5. A brake control system for a locomotive according to claim 4, wherein an external timing volume is charged by fluid pressure from the brake pipe through a choke.

6. A brake control system for a locomotive according to claim 5, wherein the first diaphragm circuit breaker compares pressure in an approximately 310 cu. in. timing volume connected through a choke to the brake pipe with pressure at the equalizing reservoir port of the manual brake control valve.

7. A brake control system for a locomotive according to claim 6, wherein the second diaphragm circuit breaker compares pressure in a 220 cu. in. reference volume with current brake pipe pressure, whereby both the first and second circuit breakers can be operated properly without modification when the locomotive shifts between 90 psi and 110 psi brake pipe normal pressure settings.

8. A brake control system for a locomotive according to claim 1, wherein the locomotive has electro-responsive means distinctively responsive to operation of the diaphragm circuit breakers for governing suppression of penalty operation of brakes of the locomotive.

9. A brake control system for a locomotive according to claim 8, wherein the first of the diaphragm circuit breakers causes temporary suppression control of the electro-responsive means to suppress a penalty brake application with less than a 17 psi, brake pipe pressure service reduction.

10. A brake control system for a locomotive according to claim 9, wherein the second of the diaphragm circuit breakers causes permanent suppression control of the electro-responsive means to suppress a penalty brake application with greater than a 17 psi. brake pipe service pressure reduction.

11. A brake control system for a locomotive having, a brake pipe, a manual control valve having respective equalizing reservoir and automotive brake penalty suppression ports and an improved suppression penalty brake control device providing both temporary and permanent penalty suppression control comprising;
  (a) a reference control valve piloted by pressured output of the automatic brake suppression port of the manual control valve when the manual control valve is in a running or release position for charging a reference volume from the brake pipe and a timing volume connected to the brake pipe through a choke,
  (b) a temporary suppression circuit breaker having a control diaphragm subject to operation by differential pressures in chambers on opposite sides of its diaphragm,
    (1) the diaphragm of the temporary suppression circuit breaker being subject to operation by a differential in pressure between a chamber connected to the timing volume and an opposite chamber connected to the equalizing reservoir, port of the manual control valve, and
    (2) contacts operated by the temporary suppression diaphragm,
  (c) a permanent suppression circuit breaker having a control diaphragm subject to operation by differential pressures in chambers on opposite sides of the diaphragm of the permanent suppression circuit breaker,
    (1) the diaphragm of the permanent suppression circuit breaker being subject to operation by a differential in pressure between a chamber connected to the reference volume and an opposite chamber connected to the brake pipe, and
    (2) circuit contacts operated by the permanent suppression diaphragm, and
  (d) circuit means responsive to the closing of contacts of either the temporary suppression circuit breakers or the permanent suppression circuit breaker for suppressing a cab signal penalty brake brake application.

12. A brake control system for a locomotive according to claim 11, wherein the timing volume is connected to the brake pipe through a timing choke for variably timing duration of temporary suppression of a penalty brake application.

13. A brake control system for a locomotive according to claim 12, wherein the reference volume is disconnected by the reference control valve from the brake pipe for permanent suppression as long as there is a service reduction of at least 17 psi.

14. A brake control system for a locomotive according to claim 11, wherein the reference control valve is operated to charge the reference volume only when the manual control valve is in a release or running condition.

15. A brake control system for a locomotive having a brake pipe, brake control means including a manual brake control valve, the brake control, means including cab signal brake control and penalty suppression apparatus including reference and timing volumes, wherein an improved penalty suppression device comprises;
  (a) means responsive to designation of penalty brake suppression by operation of the manual brake control lever for actuating a first fluid diaphragm operated circuit breaker to a closed position in accordance with a differential in pressure between the timing volume and equalization reservoir pressures, and
  (b) means responsive to designation of penalty brake suppression by operation of the manual brake control lever for actuating a second fluid diaphragm operated circuit breaker to a closed position in accordance with a differential in pressure between the reference volume and brake pipe pressures, and
  (c) circuit means responsive to operation of either or both of the first and second circuit breakers to closed positions for suppression of a penalty application of locomotive brakes.

16. A brake control system for a locomotive according to claim 15 wherein the timing volume is directly connected to the brake pipe through a timing choke.

17. A brake control system for a locomotive according to claim 16 wherein the reference volume is normally charged to brake pipe pressure and is disconnected from the brake pipe when the manual control valve is moved to a penalty suppression position.

18. A brake control system for a locomotive according to claim 17 wherein a reference pilot valve senses operation of the manual brake control valve to a penalty suppression position for charging a chamber on one side of the diaphragm of the second circuit breaker for comparing the reference volume pressure with pressure in the brake pipe which may be reduced upon designation of a service brake pressure by operation of the manual brake control valve.

19. A brake control system for a locomotive according to claim 18, wherein the first circuit breaker can be closed for temporary suppression of a penalty brake application without a full service brake application being obtained, and the second circuit breaker can be subsequently permanently closed in response to sensing a full service application pressure in the brake pipe.

20. A brake control system for a locomotive according to claim 15 wherein capacities of the reference and timing volumes are 220 cu. in. and 310 cu. in. respectively.

* * * * *